US011385856B2

(12) United States Patent
Babb

(10) Patent No.: US 11,385,856 B2
(45) Date of Patent: Jul. 12, 2022

(54) SYNCHRONIZING POSITIONING SYSTEMS AND CONTENT SHARING BETWEEN MULTIPLE DEVICES

(71) Applicant: STREEM, LLC, Portland, OR (US)

(72) Inventor: Zachary Babb, Portland, OR (US)

(73) Assignee: STREEM, LLC, Portland, OR (US)

( * ) Notice: Subject to any disclaimer, the term of this patent is extended or adjusted under 35 U.S.C. 154(b) by 0 days.

(21) Appl. No.: 17/079,080

(22) Filed: Oct. 23, 2020

(65) Prior Publication Data

US 2022/0129228 A1 Apr. 28, 2022

(51) Int. Cl.
*G06F 3/14* (2006.01)
*G06T 3/00* (2006.01)

(52) U.S. Cl.
CPC .............. *G06F 3/1454* (2013.01); *G06T 3/00* (2013.01)

(58) Field of Classification Search
CPC ................................ G06F 3/1454; G06T 3/00
See application file for complete search history.

(56) References Cited

U.S. PATENT DOCUMENTS

| 8,918,411 | B1 * | 12/2014 | Latif .................... G06F 16/951 707/758 |
| 9,426,506 | B2 * | 8/2016 | Kim .................... H04N 21/2389 |
| 9,710,970 | B2 * | 7/2017 | Jung ........................ G06T 11/00 |
| 10,453,263 | B2 * | 10/2019 | Khalid ............. H04N 21/44008 |
| 10,511,892 | B2 * | 12/2019 | Anguiano ........ H04N 21/25891 |
| 10,580,214 | B2 * | 3/2020 | Ma ........................ H04N 13/106 |
| 10,645,439 | B2 * | 5/2020 | Card, II ................. G06F 3/0304 |
| 10,679,428 | B1 * | 6/2020 | Chen ....................... G06K 9/627 |
| 10,692,289 | B2 * | 6/2020 | Barros ................. G06V 30/224 |
| 10,721,431 | B2 * | 7/2020 | Ahmann ............ H04N 21/8352 |
| 10,803,666 | B1 * | 10/2020 | Buerli .................... G06T 19/006 |
| 10,956,743 | B1 * | 3/2021 | Li ............................ G06F 3/011 |
| 11,055,049 | B1 * | 7/2021 | Peuhkurinen ......... G06F 3/1454 |
| 11,082,579 | B2 * | 8/2021 | Nakamura .......... H04N 1/32096 |
| 2012/0164938 | A1 * | 6/2012 | Jeong ...................... H04N 21/84 455/3.05 |
| 2012/0291073 | A1 * | 11/2012 | Friedman ............ H04N 21/435 725/62 |
| 2013/0222410 | A1 * | 8/2013 | Kameyama .......... H04N 13/344 345/589 |

(Continued)

*Primary Examiner* — Grant Sitta
(74) *Attorney, Agent, or Firm* — Schwabe Williamson & Wyatt

(57) ABSTRACT

Multiple devices may use cameras, sensors, and other inputs to record characteristics of an environment and generate an Augmented Reality (AR) model of the environment. Although devices may implement AR models in different incompatible systems, such as using positioning systems with different scales, unit sizes, etc., one or more devices may coordinate to determine one or more transform to be applied by one or more devices to establish a common framework for referencing AR objects in the models for the environment. With the common framework, and a language to facilitate establishing the common framework, devices may share rich content between the devices. This, for example, allows a tablet device presenting an AR space to "grab" an object out of a display present in the environment, and place the grabbed object into the AR space while maintaining proper relative dimensions and other characteristics of the object after the transfer from one space to the other.

20 Claims, 8 Drawing Sheets

(56) References Cited

U.S. PATENT DOCUMENTS

| | | | |
|---|---|---|---|
| 2013/0234850 A1* | 9/2013 | Lee | A61B 5/6898 |
| | | | 340/539.12 |
| 2014/0317659 A1* | 10/2014 | Yasutake | H04N 21/43615 |
| | | | 725/43 |
| 2017/0201808 A1* | 7/2017 | Chowdhary | H04N 21/8358 |
| 2018/0173315 A1* | 6/2018 | Hall | G02B 27/017 |
| 2019/0250873 A1* | 8/2019 | Blume | G06F 3/011 |
| 2019/0333479 A1* | 10/2019 | Maalouf | G09G 5/38 |
| 2020/0126265 A1* | 4/2020 | Gade | G06F 3/012 |

* cited by examiner

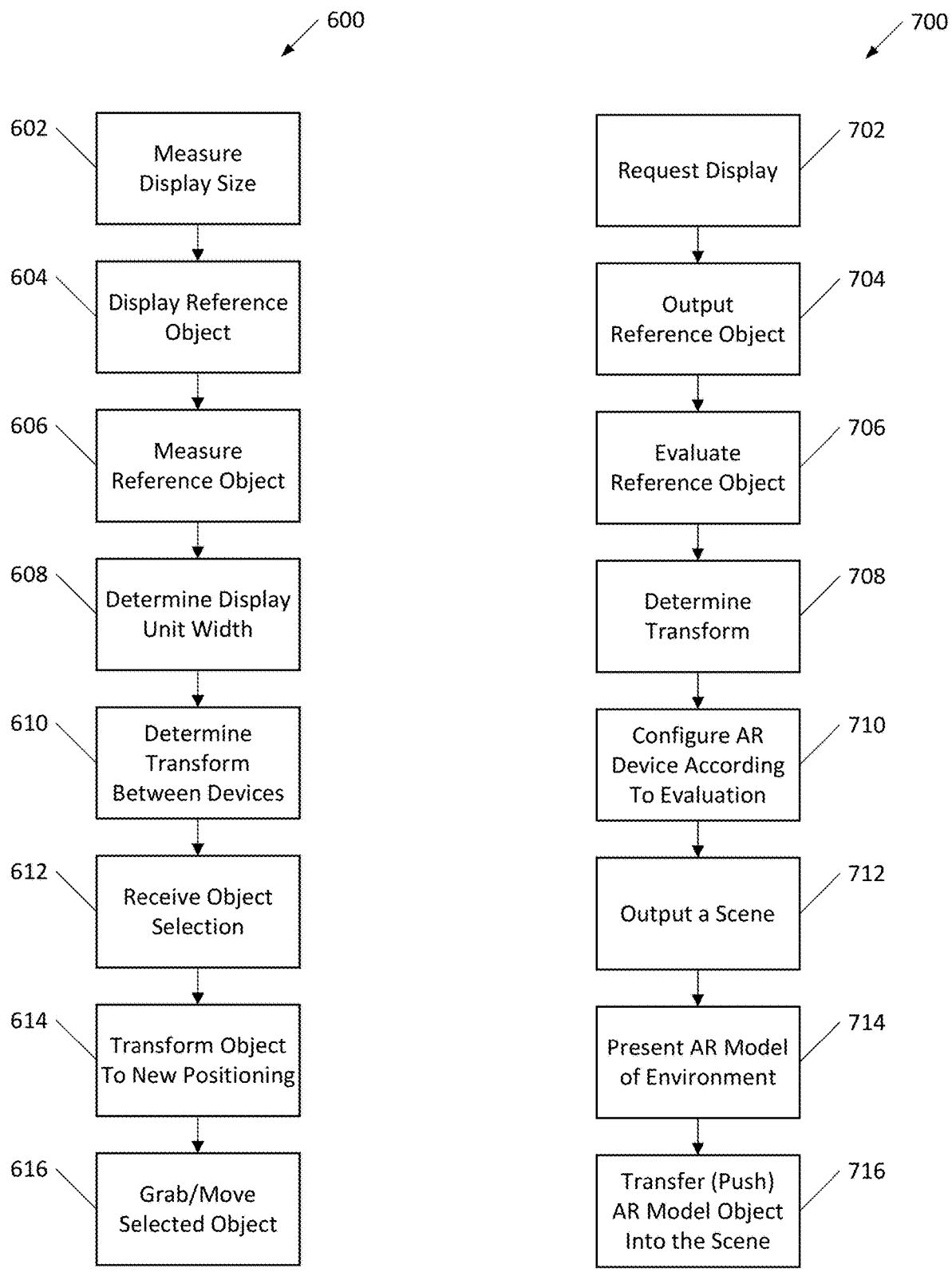

US 11,385,856 B2

SYNCHRONIZING POSITIONING SYSTEMS AND CONTENT SHARING BETWEEN MULTIPLE DEVICES

TECHNICAL FIELD

The present disclosure generally relates to the field of augmented reality (AR), and more specifically to sharing coordinate systems between multiple devices to facilitate moving AR objects between multiple devices.

BACKGROUND AND DESCRIPTION OF RELATED ART

Portable devices such as smart phones, tablets, laptop computers, notebook computers, gaming consoles, and the like are increasingly capable of supporting augmented reality (AR). These devices may capture images and/or video through use of cameras or other sensors, and, depending upon the particulars of a given AR implementation, the captured images or video may be processed using various algorithms to detect features in the video, such as planes, surfaces, faces, and other recognizable shapes. These detected features, combined in some implementations with data from depth sensors and/or motion information captured from motion sensors such as a MEMS gyroscope, accelerometers, and LIDAR (Light Detection and Ranging), can facilitate AR software in creating representations and presentations of the real world in an Augmented Reality (AR) space combining real and virtual data.

Sensor data may be processed by a device, and may be used by or in conjunction with AR kits (software toolkits) such as those provided by Apple, Google, and others, to establish a model of an environment that may include representations of both real and virtual constructs. Artificial Intelligence or machine learning tasked with interpreting sensor data may be able to assist in constructing the model. AR kits may be used in conjunction with AR-based applications to generate and/or manipulate AR models of an environment.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

FIG. 6 illustrates a flowchart, according to one embodiment, for determining and using a transform between different positioning systems.

FIG. 7 illustrates a flowchart, according to one embodiment, for determining and using a transform between different positioning systems.

DETAILED DESCRIPTION

Figure 1:
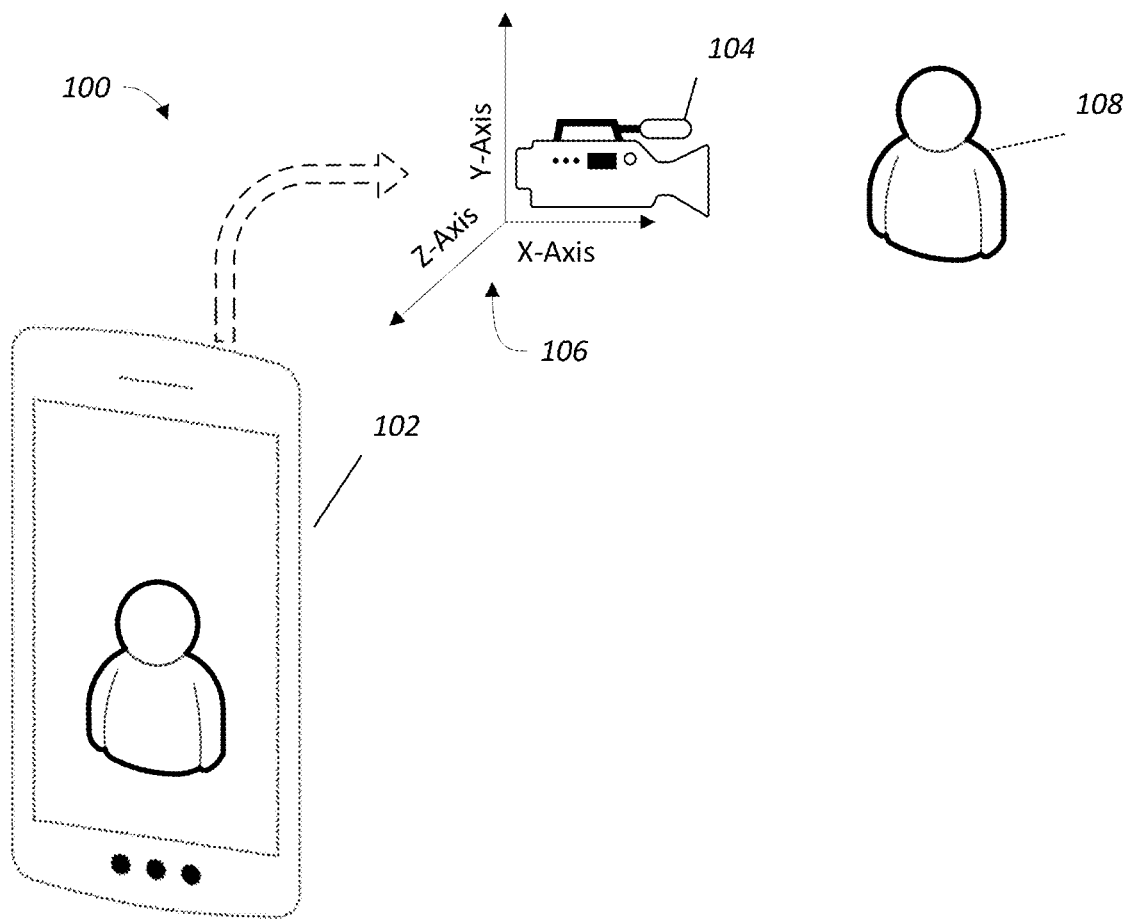
FIG. 1 illustrates an exemplary system that may enable capture of an image or video that includes AR data.

When multiple devices are operating in a particular environment, each may be creating their own AR models representative of the environment. Unfortunately there is no way to seamlessly share these different models between the different devices. While conceptually it may appear straightforward to imagine sharing some or all of an AR model with other devices, in practice, since each device may be using different modeling tools, coordinate systems, scales, etc., one may not simply transfer objects from one device's model and instantiate it on another. Various exemplary approaches to address this are discussed below.

In the following detailed description, reference is made to the accompanying drawings that form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations do not have to be performed in the order of presentation. Operations described may be performed in a different order than the described embodiment. Various additional operations may be performed and/or described operations may be omitted in additional embodiments. For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "in embodiments," which may each refer to one or more of the same or different embodiments. Furthermore, the terms "comprising," "including," "having," and the like, as used with respect to embodiments of the present disclosure, are considered synonymous.

The term "device" as used herein is intended to broadly mean any mobile and non-mobile device, including a smart phone, tablet, laptop computer, notebook computer, gaming console, virtual reality (VR) headset, VR glasses (or any other surface capable of receiving or displaying AR data), etc., as well as a computer, server, super computer, roadside unit (RSU), etc., and also less conventional computing platforms such as a car, bus, motorcycle, bike, plane, drone, balloon, or any device or vehicle equipped with sensors, including a heads-up display (HUD) that may be incorporated into or operating along with a mobile or non-mobile device. A device may be configured to monitor and/or interact with an environment to model the environment with representations of real and virtual objects. It will be appreciated devices may model an environment individually, or, as discussed below, exchange data with other devices, to cooperatively model an environment.

An Artificial Intelligence (AI) may assist operation of a device, assist with one or more model, e.g., developing, manipulating, sharing, deleting, transforming, etc. Model content may be based what is detected by a device, as well as by other devices sharing data. Shared data may include sensor data detected by other devices, as well as represent all or a portion of a model known to another device. A limitation of any device is that its input is typically limited to what it can sense. There may be sensor interference from physical and/or environmental obstructions, such as permanent or temporary structures, weather, electromagnetic (EM) or ultrasonic interference, extreme temperatures, unusual lighting, etc. Devices may be communicatively coupled over various direct and indirect network technology discussed below.

A device that supports Augmented Reality (AR) may provide an AR session on a device-local basis (e.g., not requiring communication with a remote system), such as allowing a user of the device to capture a video using a camera built into the device, and superimpose AR objects upon the video as it is captured. Support for superimposing AR objects may be provided by the device's operating system, or by use of an AR application programming interface (API) which may be incorporated into an operating system, or through use of an AR application which may make use of and/or provide an API. Examples of AR APIs include Apple Computer's ARKit, Google's ARCore, provided by Android, and Unity Technologies' Unity platforms and tools.

AR APIs typically use both the stream of frames captured by the device camera as well as other available data to compute a point cloud. The available data may include motion data, such as from a gyroscope and/or accelerometers contained within the device, or other sensor data, such as LIDAR sensor data (which may be built into a device. A point cloud typically includes one or more points that are indicated by at least an x, y position within the video frame along with a depth (or z-axis). The points are often tied to an identified anchor feature within the frame, e.g. a corner or edge of an object in-frame, which can be readily identified and tracked for movement between frames. The associated x, y, and z ("coordinate") values allow the point to be identified in space relative to the device, along with other associated data, if any. As will be appreciated, coordinates will continuously change for each detected and/or calculated point as the camera of a capturing device moves in space relative to the anchor features. In some implementations, each point in the point cloud may include additional data, such as a confidence value indicating the API's estimate of the accuracy of the computed depth value, location of the anchor point, and/or possibly other extrapolated values. As noted above, a device may, in addition to using sensed data, also incorporate video, photo, sensor, and/or AR related data and models received from and/or retrievable from other devices.

The calculated point cloud allows AR objects to be placed within a scene and appear to be part of the scene, and therefore an AR may object move through the camera's view similar to other physical objects within the scene as the camera moves. Further, by employing object detection techniques and/or motion data, a device may maintain track of points (or objects) that move out of the camera's field of view. This allows a placed AR object to disappear off-screen as the camera moves past its placed location, and reappear when the camera moves back to the scene location where the AR object was originally placed.

As will be appreciated by one skilled in the art, a point cloud represents location data about the physical world relative to and surrounding the capturing device. The various points in the point cloud are thus typically expressed in a coordinate system which, in one embodiment, may be values relative from the capturing device. When a capturing device moves, e.g. is panned or tilted, in a sense, these values change, e.g. can be recomputed using sensed motion data about the movements of the capturing device, as though the world were moving about the capturing device's position, with the capturing device serving as a fixed reference point. The motion data captured by the capturing device, then, effectively expresses how the world moves about the capturing device. As the capturing device moves, an increasing amount of the world becomes visible to the capturing device. When combined with continued tracking/storage of detected points that move outside the camera's field of view, the point cloud representing the world detected and viewed through the capturing device's camera that is initially generated can be progressively increased and expanded.

By combining point cloud data with captured images and/or video and/or any AR information, useful structures, such as a 3D mesh and/or 3D scene graph, representing the world detected by the capturing device can be generated. By combining point cloud data with images from a device's associated video input, a 3D mesh can be subsequently rendered as a model of the detected world. Further, in some embodiments, video frames from a video input may be correlated with its captured AR data, and image information from video frames may be mapped upon the 3D mesh, to effectively create a relatively photo-accurate 3D model of the world captured by the capturing device. This 3D model, in embodiments, can be manipulated in a 3D environment and viewed from perspectives different from the original capturing device.

In some embodiments, the 3D model can be progressively generated and expanded on the fly as the capturing device continues to move about its environment, viewing previously uncaptured portions of the environment. When the capturing device moves back to previously viewed portions of the environment, the 3D model can be augmented and/or refined, particularly where the capturing device is viewing the previously viewed portions at a different perspective, even if only slightly different from the initial perspective. In some embodiments, multiple models from different devices may be combined into a combined model incorporating data from both models. It will be appreciated different models may track and store one or more anchor points or reference objects that facilitate coordinating the positioning systems used by different devices so that their models may be transformed as needed to allow exchanging content between different models.

The introduction of AR APIs, such as those from Apple and Google, provide options for adding rich content to 3D model environments. These APIs may be considered light weight in that they only require commonplace devices such as a smart phone or tablet, and with it a user can enter into an AR space and interact with rich content in the AR space. Typically, users have been limited to interacting with models and content within their own device, e.g., you can only work with what is sensed by your device, such as through its camera(s) or other sensor(s). However, as will be discussed below, a device's AR model may be shared between two devices, even if two arbitrary devices use different positioning systems to model their representation of their environment. These devices may be able to interact, share data, merge models, and/or synchronize objects in their respective AR models.

For example, as will be discussed below with respect to FIG. 4, two different devices with different internal positioning systems for their AR models may use a shared coordinate system to transform between their models. It will be appreciated one or both devices may employ a transform to modify their (or the other device's) positioning system so that the models are effectively using the same positioning system. For example, to exchange data between a handheld AR device such as a mobile telephone, and a traditional screen space (e.g. a display or other output) such as an Apple TV or other device, a transform between positioning systems of these devices would enable content to enter the screen from AR space and/or exit the screen into AR space.

To facilitate sharing AR model information between multiple different devices, it is assumed the devices have one or more communication channels to enable communication between the devices, and that the devices are able to agree on a transformation to convert between various coordinate systems employed by other devices. Such sharing has not been possible since, for example, there are disparities between the size of device outputs (e.g., display, screen, projector, etc.). Output disparities may be addressed when a device includes or has access to a tool to accurately measure another device's output (e.g., screen size).

FIG. 1 illustrates an exemplary system 100 that may enable capture of an image or video that includes AR data. System 100 may include a consumer device 102. In the depicted embodiment of FIG. 1, consumer device 102 is a smartphone, which may be implemented as a device in accord with FIG. 7 item 700, discussed in greater detail below. Other embodiments may implement device 102 as a variety of different possible devices, such as a computer (desktop or laptop), tablet, two-in-one, hybrid, smart glasses, or any other computing device that can accept a camera and provide necessary positional information, as will be discussed in greater detail herein. Consumer device 102 further may include a camera 104 and a spatial position sensor 106 (depicted by a series of axes), which provides information about the spatial position of camera 104. It will be understood that camera 104 and spatial position sensor 106 may be contained within the body of device 102. Camera 104 is used to capture the surrounding environment of device 102, and by extension, the user. The environment may include one or more three-dimensional objects 108.

Camera 104 may be any camera that can provide a suitable video stream for the intended purpose of consumer device 102. Where consumer device 102 is implemented as a smartphone or tablet, camera 104 may be one or more built-in cameras. In other embodiments, such as where consumer device is a laptop, camera 106 may be built in or a separate, external unit. A suitable video stream may be a digital video stream, and may be compressed in embodiments with some form of video compression, such as AVC-HD, H.264, MPEG-4, or another suitable compression scheme. Camera 104 may be configured to output standard or high-definition video, 4K video, or another resolution of video suitable for the intended purpose of camera 104 and consumer device 102. In other embodiments, such as where consumer device 102 is equipped with multiple cameras or similar sensors, one or more of the sensors may be configured to directly detect depth points, such as a 3D camera, LIDAR, or other suitable depth-sensing technology.

Spatial position sensor 106 may be configured to provide positional information about camera 104, such as camera 104's pan and tilt. Other measured positional vectors may include camera movements, such as the camera rising or falling, or moving laterally. Spatial position sensor 106 may be implemented with micro or MEMS sensors, such as gyroscopes to measure angular movements and accelerometers to measure linear movements such as rises, falls, and lateral movements. In other embodiments, spatial position sensor 106 may be implemented using any suitable technology capable of measuring spatial movements of camera, including but not limited to depth sensors 104. In some embodiments, spatial position sensor 106 may comprise multiple sensors, each potentially measuring a different type of spatial position information, e.g. a 3-axis gyroscope to measure angular changes, a 3-axis accelerometer to measure velocity/translational changes, a magnetic compass to measure heading changes, a barometer to measure altitude changes, a GPS sensor to provide positional information, etc.

It will be appreciated there are many different techniques that may be employed for object and other data recognition in input data, such as visual input data. Through use of a device's input systems, possibly in conjunction with external perspectives provided by external cameras, sensors or environment models, a device may individually or cooperatively operate to interact with and model its environment. As will be discussed below, multiple devices may coordinate, using, for example, a common language, to sync their positioning systems to allow sharing some or all of their models and/or content between various cooperating devices. It will be appreciated that some or all of the elements of the system of FIG. 1 may be implemented in a variety of devices, including portable devices such as mobile telephones, tablets, notebook computers, laptop computers, and other portable or movable machines.

An exemplary machine that may provide some or all of the FIG. 1 components is a fourth-generation iPad Pro running, for example, iPad OS 13.4. This device is equipped with the Apple ARKit and a LiDAR Scanner, which may be used to create a polygonal model of a physical environment seen by the iPad. The LiDAR Scanner may retrieve depth information from a wide area in front of the iPad, and the ARKit may estimate the shape of the real world. ARKit converts the depth information into a series of vertices that connect to form a mesh. To partition the information, ARKit makes multiple anchors, each assigned a unique portion of the mesh. Collectively, the mesh anchors represent the real-world scene around the iPad. The AR kit from Google and others provide similar functionality, in that they provide a framework to enable software to relatively easily model the environment of a device.

Figure 2:
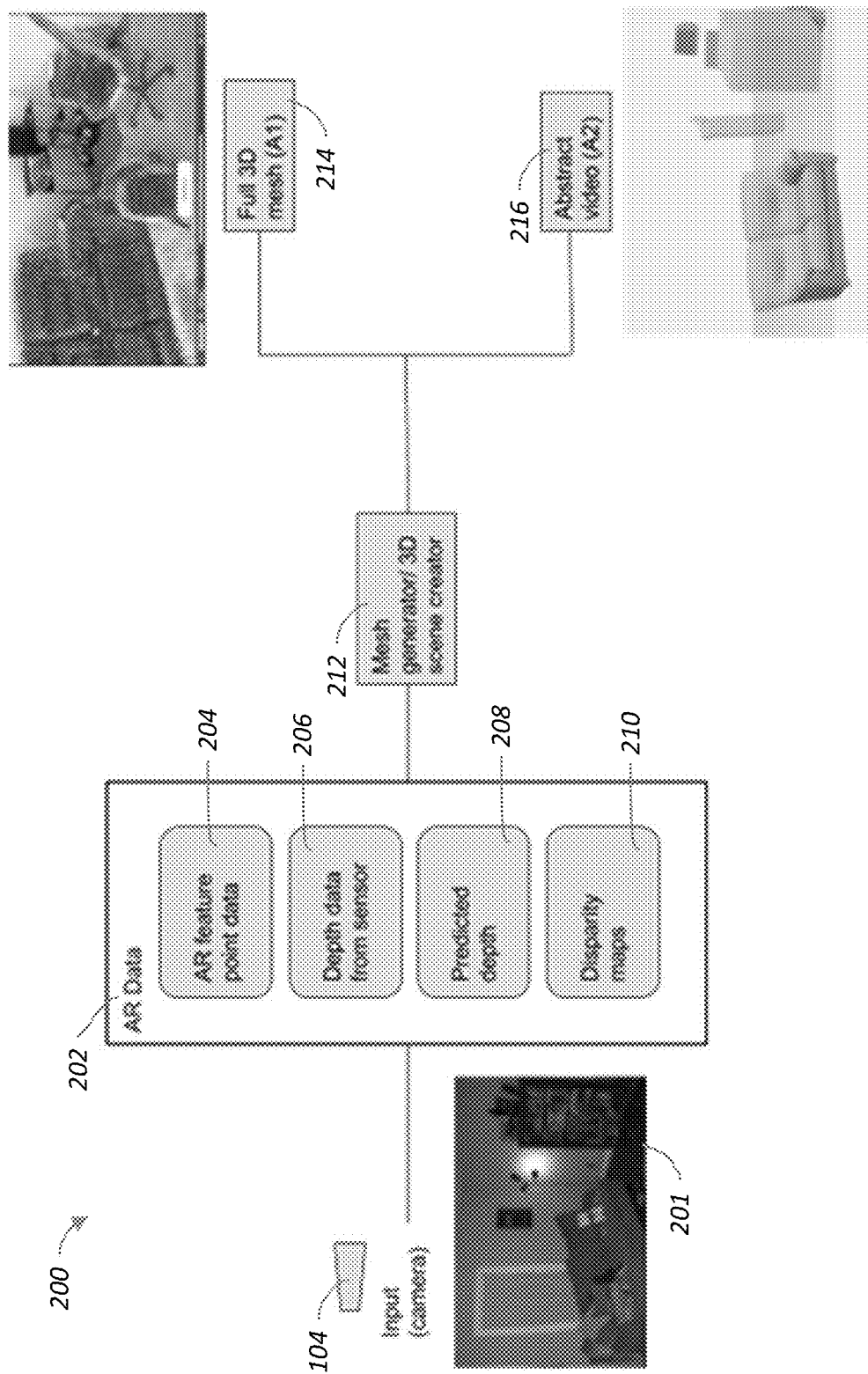
FIG. 2 illustrates an exemplary method for creating a 3D mesh.

FIG. 2 illustrates an exemplary process flow 200 for creating a 3D mesh base on the capture of a video and associated AR data, and subsequent processing of the video and data. Initially, a video 201 is captured by an input device, such as a camera 104, along with associated motion data (not depicted). This video 201 is then, in embodiments, processed by the AR API of the capturing device (e.g. ARKit, ARCore) to generate AR data 202, which may be tagged to the video 201. Note that, in one embodiment, AR data 202 is not data about AR objects, rather, AR data 202 is the data that corresponds to video 201 that may enable placement of AR objects within the captured scene. This AR data 202 may then be used to generate a mesh and/or 3D scene by a mesh generator/scene creator 212. Finally, the mesh and/or 3D scene can be used to generate a full 3D mesh 214, which includes frames from the video 201 (and/or other sources of relevant images) mapped upon the 3D mesh 214 to generate a relatively realistic model. Alternatively or additionally, an abstract video 216, which may present an untextured representation of the scene captured by the camera 104, may be generated from the detected points in the point cloud. The model can then be used in an interactive fashion.

In the depicted embodiment of FIG. 2, AR data 202 may be captured contemporaneously with and/or extracted from, video 201, and may be tagged to video 201, potentially on a frame-by-frame basis. AR data 202 may include AR feature point data 204, depth data from the sensor 206, predicted depth data 208, and/or disparity maps 210. Other embodiments may include additional data types, different data types, or fewer data types. The various types of AR data 202 may be derived from various raw data inputs, including RGB images (such as the sequence of frames of video 201), camera intrinsics and/or camera transforms (such as from camera 104 and/or spatial position sensor 106), 3D feature points, and/or depth images, among other types of possible data. In addition to motion data from spatial position sensor 106, camera intrinsics may include various known or determined properties of camera 104, such as focal length, aperture, optical center, angle of view, focal point, etc. For example, if the AR device does not have a tool to reliably compute distance values (e.g., a LiDAR tool), one skilled in the art will understand attributes of the camera and of what is visible allow a rough approximation of depth in the field of view.

Camera transforms can include the various variables necessary to transform between the 3D objects within the field of view of camera 104 and the 2D image plane of the camera 104. Such variables can include information about the spatial location of the capturing device. 3D feature points can include feature points useable by the AR API to create the AR feature point data 204, and may be extracted from video 201, such as various anchor points or features, and/or captured using one or more sensors that are separate from video 201, such as spatial position sensor 106. Depth images can include imaging captured by a depth-sensitive device, such as a LIDAR sensor or infrared range finder, to allow for direct, and potentially more precise, depth measurements of various points within the scene captured by camera 104. Where direct depth measurements are available, data similar to that available for camera 104 may be used to process depth measurements and correlate with the images from camera 104.

AR feature point data 204 can include data concerning or otherwise identifying various feature points in the captured scene that are identified by the AR API. These feature points may include anchor points corresponding to various identified features such as edges, points, planes, and other features detected via an object recognition algorithm or other suitable technique, and/or otherwise detected directly or indirectly by a sensor such as spatial position sensor 106. Depth data from sensor 206 may include the aforementioned direct depth measurements, which may be correlated with identified AR feature point data 204 by the AR API. Corollary to or alternative to depth data from sensor 206 includes predicted depth data 208, which the AR API may derive from any number of techniques, such as machine learning, or photogrammetry and comparison between proximate frames of the captured video. Similar to such comparison are disparity maps 210, which may include a map indicating the field of view differences between left/right frames in the case of a stereo camera, or proximate frames of the captured video. A disparity map 210 may be useful for computing points in the point cloud, including obtaining predicted depth data 208. It should be understood that proximate frames need not be temporally adjacent in video 201, but rather proximate in terms of field of view: two frames need only simply share at least an overlapping portion of a given scene to be considered proximate for purposes of a disparity map 210.

The mesh generator/scene creator 212, in embodiments, receives the AR data 202 and uses it to generate a 3D mesh, which may then be output as a full 3D mesh 214 and/or an abstract video 216. It accomplishes this by executing one or more of the steps of method 300, described below with respect to FIG. 3. The resulting output from the mesh generator/scene creator 212 can be a full 3D mesh 214, where the RGB image from various frames of video 201 are mapped onto a 3D mesh generated using the AR data. Such a process may be considered a type of texture mapping, where the RGB image of various frames are used as texture maps. Such mapping requires that the AR data 202 be correlated to each frame from the video 201. Mapping the RGB image from various frames of video 201 effectively stitches the frames together as they are mapped onto the 3D mesh. The full 3D mesh 214 provides a geometric representation of the captured scene. The full 3D mesh 214 can be used for various purposes, such as simulating physical interactions with objects in the environment represented by the full 3D mesh 214, taking measurements of the represented environment, later exploration or walkthrough, or another suitable purpose. Also or alternatively, an abstract video 216 can be output.

It will be appreciated that the FIG. 2 embodiment is provided for exemplary purposes regarding using an AR kit and generating a 3D mesh of an environment. It is understood the illustrated operations are presented at a high level and that numerous details are left out for clarity. Further, while the illustrated embodiment is discussed as operating in conjunction with an AR kit provided by Apple, Google, or the like, it will be appreciated that generation of a full 3D mesh may be provided entirely by an AR kit.

Figure 3:
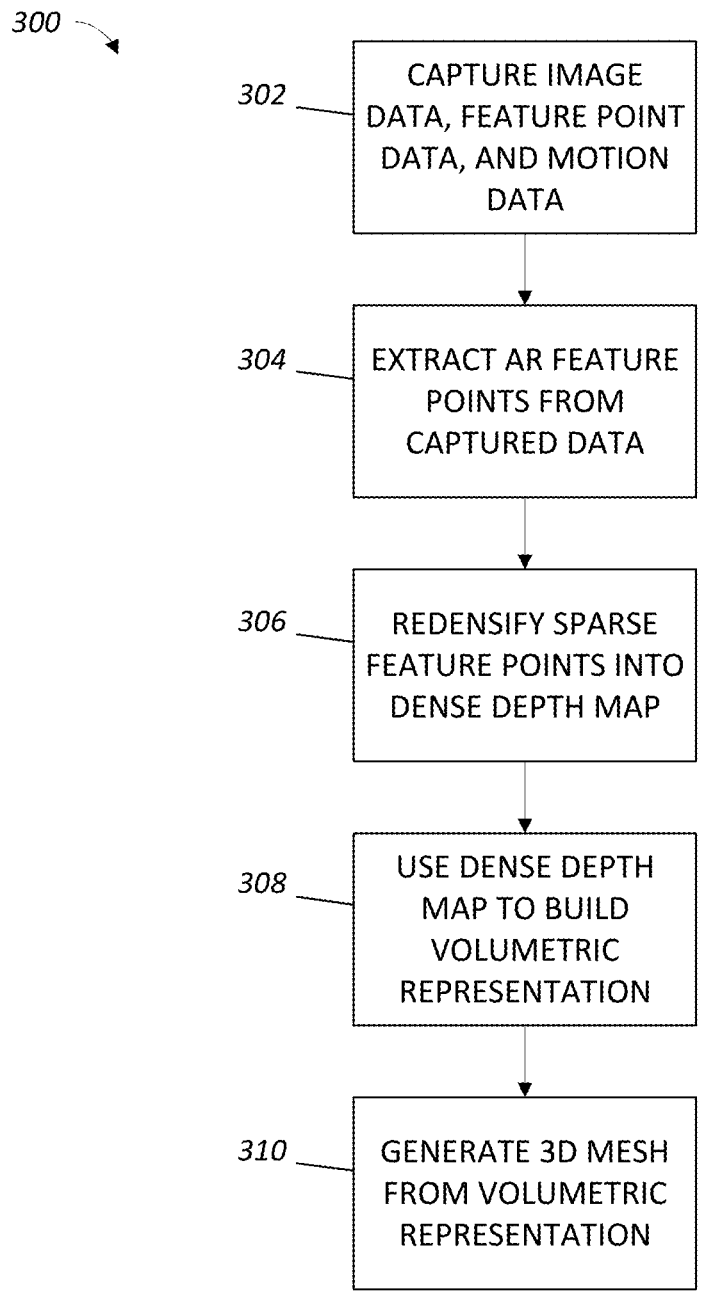
FIG. 3 illustrates an exemplary method for using AR data to generate a 3D mesh.

FIG. 3 illustrates an exemplary method 300 for using AR data, such as AR data 202, to generate a 3D mesh. Various embodiments may implement only some or all of the operations of method 300, and each of the operations of method 300 may be performed in whole or in part. Some embodiments may add additional operations. In operation 302, a video may be captured along with associated AR data, as described above with respect to FIGS. 1 and 2. The AR data may be associated with each frame of the video or with a group of frames, and may include data as described above, such as camera intrinsics, camera transforms, 3D feature points, depth images, and/or any other relevant information that may be captured or otherwise made available. The captured video may come from a variety of sources. In some examples, a camera 104 is used to capture the video. In other examples, a different device or devices may be used to capture the video. The AR data may come from, in some examples, other sensors as described above with respect to FIGS. 1 and 2, such as spatial position sensor 106. In embodiments, the video and AR data are captured contemporaneously to ensure appropriate association between the AR data and corresponding video frames. The video and associated AR data may be captured at a previous time, and stored into an appropriate file format that captures the video along with the raw feature points and motion data. Method 300 may then be performed on the stored video and associated data in post-processing.

In operation 304, AR feature points may be extracted from the captured video, also as described with respect to FIGS. 1 and 2. In embodiments, operation 304 may be performed in whole or in part by an AR API, as discussed above on a capturing device. The AR feature points may be obtained, such as by the AR API, using simultaneous localization and mapping (SLAM), or another suitable technique. In examples where the video is provided as a file from a past capture, the AR feature points may be stored with the video, and correlated to each video frame, similar to the AR data discussed above with respect to operation 302. In some embodiments, the AR feature points may be calculated from a raw video without associated AR data using photogrammetric techniques.

The AR feature points may be relatively sparse with respect to the captured video, such as where the AR feature points are calculated by an AR API contemporaneously with the video capture. In operation 306, the video and associated AR data are used to redensify the captured AR feature points into a dense depth map. Various algorithms and techniques may be used to create a dense depth map. One technique, in various embodiments, is where a capturing device has or is associated with a sensor that can directly measure depth points in a scene. The direct measuring sensor may be capable of providing sufficient directly measured depth points to produce a dense depth map. Another possible method is to use a disparity map, such as disparity maps 210 of AR data 202, to estimate depth data and propagate the data to areas of a similar or low gradient within the disparity map. Such an approach may be considered a form of photogrammetry, relying upon perspective differences between two given frames of approximately the same scene. Still another method may employ a trained neural network (e.g. trained using images and associated dense depth maps) to process a given frame and generate the densified depth map. The foregoing are intended to be examples only, and not a comprehensive list of possible approaches to creating the dense depth map. Other approaches that are now known or later developed may be applied for dense depth map creation, depending upon the specifics of a given implementation.

In operation 308, the dense depth map is used to build a volumetric representation of the space captured in the video, e.g., represented as a volumetric truncated signed distance function (TSDF) volume. Other techniques may be used to build the volumetric representation, and/or express the volumetric representation. Further, as with operation 306, operation 308 may be repeated iteratively for each frame to build, if desired, a complete representation from an entire captured video. In operation 310, the volumetric representation is used to generate a full 3D mesh. The full 3D mesh, in embodiments, is a collection of vertices and triangles that connect the vertices. Each vertex may have various types of data attached or otherwise associated with it. In addition to building a 3D mesh, captured video and associated AR data (including data calculated in the various operations of method 300) are useful for performing object detection, which may be employed to extract various 3D objects from a captured video. Following object detection, a 3D scene graph may be constructed, which can be used for triggering content, such as AR content, at specific locations within the 3D mesh based upon the determined locations of the various 3D objects. As with FIG. 2, it will be appreciated that some or all of these operations discussed for FIG. 3 may be provided by an AR kit.

Figure 4:
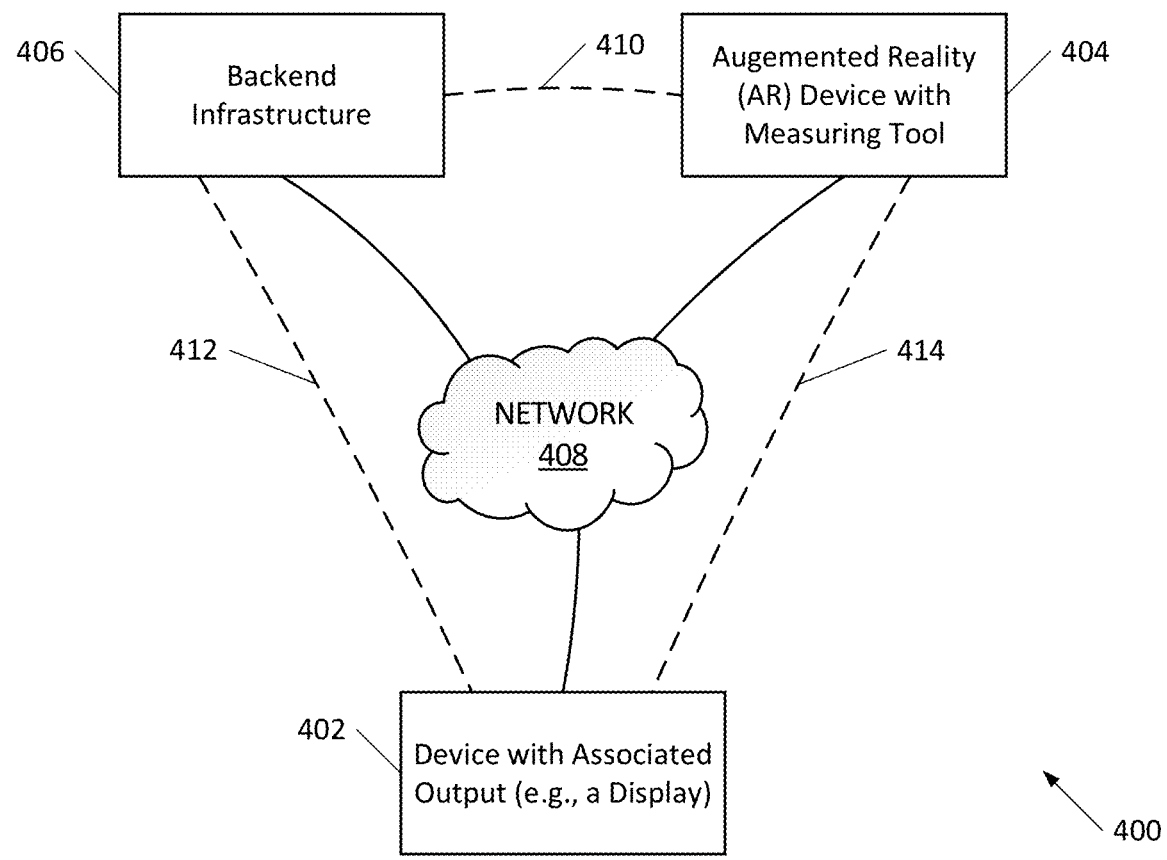
FIG. 4 illustrates an exemplary environment for sharing AR Information between devices.

FIG. 4 illustrates an exemplary environment 400 for sharing AR Information between devices 402, 404. Enabling exchanging data between, e.g. a mobile telephone ("AR space"), and, e.g., a TV or other display ("screen space"), provides opportunity to present a richer interaction between AR device users and their displays and other output from other devices. For example, one might play a game where content from the screen comes out toward the AR device (e.g., a mobile telephone or other mobile device) and interact in a meaningful way. As another example, AR items modeled by the AR device, such as potions or other objects/items, may be "thrown into the display" to assist characters in the game. As yet another example, environmental effects may be added to screen content. For example, there could be a fire on a show being watched, and the space around the screen can be filled with smoke. As another example, rich call-to-actions may be presented in AR space around the screen, and then feedback on the action may be presented with content in or coming out of the screen. For example a user could be watching a cooking show with an AR call-to-action to save a recipe, when the user decides to save the recipe, a clip of the current video frame of the show could appear to jump off of the screen and be moved to the user's pocket. It will be appreciated by one skilled in the art that these are exemplary interactions between multiple devices, and that other actions are intended to be covered by the disclosed embodiments.

Sharing between one or more devices can be complex since, as noted above, each device may have its own positioning system. For the purposes of the illustrated embodiment, the positioning system is assumed to correspond to the coordinate systems used to represent objects in AR. However, it will be appreciated that positioning systems may associate other information with coordinates, and in some embodiments, a transform between one positioning system to another includes a transform between coordinate systems as well as a conversion of associated data as necessary. Devices may also have associated outputs, such as a display, printer, projector, etc. that present AR to a user in some user-perceptible manner. If two devices are not both configured to understand an output used by the other device, a transform may be developed so that the devices may exchange AR objects and/or data.

In the illustrated embodiment, a first device 402 is associated with an output. For simplicity assume the output is a display, but it will be appreciated the output may be any device that provides output identifiable to another device. For example, user-perceptible output to a display is identifiable to another device. A second device 404, e.g., Augmented Reality (AR) device, wants to interact with the first device 402. The first device 402 maintains an AR model of which some portion of the model is presented on its associated display. The first device 402's AR model may be based at least in part on communication with a backend infrastructure 406 that is providing rich content to the first device 402, and some portion of this content may be displayed by the first device 402. The first device 402 may also share some or all of this content and/or its AR model with the second device 404. It will be appreciated the second device 404 may communicate with the backend infrastructure to obtain content directly in addition to content received indirectly from the first device 402.

Regarding communication between the devices 402, 404 and the backend infrastructure 406, it will be appreciated that there are many different public, private, peer-to-peer, etc. communication pathway options to interconnect the devices. Examples include a network 408 which may be a public network such as the Internet and/or a private network such an intranet and/or direct device-to-device communication. The network 408 is intended to be a general placeholder for any communication pathway that may be used to communicatively couple the devices and backend infrastructure. Also illustrated are dashed lines 410, 412, 414 that may represent direct communication between the first and second devices 402, 404 and the backend infrastructure. These pathways may be defined with respect to communication occurring through public and/or private networks such as network 408, or it may represent direct, e.g., peer-to-peer, device-to-device, point-to-point, or other communication technology providing a direct connection between two or more devices.

In the illustrated embodiment, the first device 402 may have an associated output, e.g., a display, projector, screen, 2D or 3D printer, holographic display, etc. of unknown size. The second device 404 may have an associated (e.g., built-in or otherwise accessible) measuring tool, such as a LiDAR sensor (also known as a 3D Time of Flight (TOF) sensor). The LiDAR sensor is presented for exemplary purposes and other sensing or distance determination technology (e.g., as discussed above with respect to FIG. 2) may be used. In various embodiments, second device 404 may be implemented as a computer device 800, discussed below with respect to FIG. 8. In one possible embodiment, the second device 404 may be Apple Computer's LiDAR enabled iPad Pro. The backend infrastructure 406 may deliver rich content to the first device 402, and content may be delivered directly and/or indirectly, e.g., over one or more of the network 408 and/or a direct communication path 412. The first device 402 may display the rich content, as well as share the rich content with the second device 404. The shared content may be delivered directly and/or indirectly, e.g., over one or more of the network 408 and/or a direct communication path 414. It will be appreciated the second device 404 may receive the rich content from the backend infrastructure 406, and the content may be delivered directly and/or indirectly, e.g., over one or more of the network 408 and/or a direct communication path 410. The second device 404 may also exchange content with the first device 402, and the content may be delivered directly and/or indirectly, e.g., over one or more of the network 408 and/or a direct communication path 414.

It will be appreciated that transfer between devices 402, 404 and backend infrastructure 406 of content and data associated with the content, may use a Domain-Specific Language (DSL) that may be (but does not have to be) built on top of an AR API, such as was discussed above with respect to FIGS. 1-3. It will be appreciated that the DSL may be incorporated into an AR API and simply be part of the API and not considered, for example, to be an additional layer on top of an API and/or AR environment. In the illustrated embodiment, the DSL indicates how the receiver of a communication should update itself, e.g., how it should modify its model of the augmented reality, update its output, or take some other action. For example, the first device 402 may communicate to the second device 404 that it should display a particular image a specified distance to the right of a display used by the first device 402. The second device 404 may, for example, accept a tap on that image (or receive other input to correspond to user interaction) and communicate, for example by way of the DSL, to the first device 402 that an interaction has occurred in the image. This may result, for example, in the first device 402 updating its display responsive to the interaction with the image.

Figure 5:
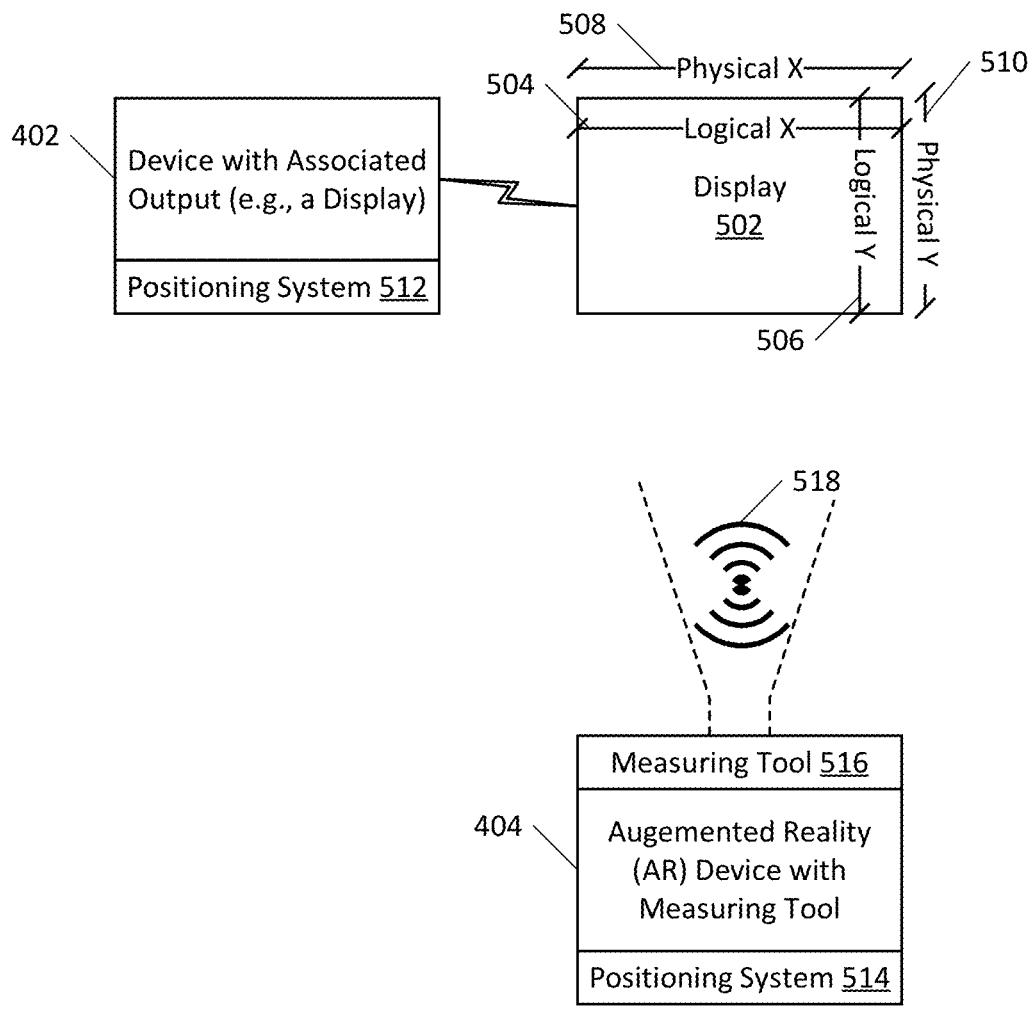
FIG. 5 illustrates, according to one embodiment, a method devices and backend infrastructure to establish a transform between positioning systems used by the devices.

FIG. 5 illustrates, according to one embodiment, a system for the FIG. 4 devices 402, 404 and backend infrastructure 406 (shown in FIG. 4) to establish a transform between positioning systems used by the devices 402, 404. It will be appreciated that the devices may be using the same or already synchronized positioning systems and no (further) transformation is required, but for this embodiment, a transform needs to be established.

Assume first device 402 has an attached display 502. For example, the first device 402 could be an Apple TV or equivalent device. The first device 402 may use a framework, such as Apple's SceneKit, to establish a three dimensional space inside of its display according to its internal positioning system 512. As will be understood by one skilled in the art, the units of this three dimensional space, e.g., logical dimensions X and Y 504, 506 representing the display 502 (as compared to real-world measurement) may be arbitrary as the size of the output associated with the device, e.g., the physical X and Y dimensions 508, 510 of the display 502 in this example, is dependent on what is providing the output, e.g., it could be a 20 inch, 40 inch, 80 inch, etc. display. Second device 404 may be unable to effectively determine the actual physical size of the output being used. Further, even if a display may be identified through its connection to the first device 402, this identification may not reliably identify the display 502 and guarantee what is identified is what is perceived when viewing the display 502. Thus, while the first device 402 may internally logically represent the display 502 as a space X units wide 504 by Y units high 506 (e.g. 3840×2160 pixels, for a 4 k monitor) within its positioning system 512 (corresponding to logical dimensions 504, 506), the actual physical size (corresponding to physical dimensions 508, 510) of the display 502 presenting the space is not reliably known. For example, a 4 k monitor (3840×2160 pixels) may be of an arbitrary physical size, such as 27" diagonal, 50" diagonal, 65" diagonal, etc., where each size has the same pixel resolution, but the pixels increase in size as the physical monitor size increases. Moreover, some devices may accept as input a resolution lower than the screen's native resolution, then automatically scaling the input to the screen's native resolution. For example, a 4 k monitor (e.g. monitor with a native resolution of 3840×2160 pixels) may accept an input signal of 1920×1080, and then internally scale the lower resolution signal to fit the monitor's native resolution. The device providing the lower resolution signal, such as first device 402, may not be aware of the monitor's actual native resolution and/or may not be aware that the display is performing scaling. Further, this information may or may not be known by first device 402, such as where first device 402 is separate from display 502, and display 502 does not provide first device 402 with any information that would allow first device 402 to obtain the physical dimensions of the display 502.

The second device 404 may have a simpler positioning system 514, e.g., a coordinate system, as it may be assumed to be based in the real world. Assuming the second device 404 is also using a framework such as Apple's ARKit, the second device 404 may model a three dimensional AR scene in the real world. As noted above, in a particular embodiment the second device 404 may be a specific computing device 600, such as an Apple iPad Pro with LiDAR. In the second device 404's positioning system, one unit in any direction may correspond to one meter in the real world. It will be appreciated that the Apple ARKit is presented here for exemplary purposes only and that other AR kits or AR APIs may be used. So long as the kit or AR API may communicate through a DSL or other common language to compatibly exchange, for example, data, operations, transforms, events, actions, etc., the specific kits/APIs used are less important.

To establish a shared positioning system between the two devices 402, 404, the second device 404 may use a measuring tool 516 to measure 518 the physical dimensions 508, 510 of the display 502. With a measuring tool, such as a LiDAR tool, it is not required to manually obtain the display measurements, nor risk attempting to query display 502 for its theoretical dimensions. Instead, dimensions may be accurately measured as needed. Once the display 502's dimensions are known, as will be discussed below, a reference object may be presented on the display 502, and used along with the measured display dimensions to convert between positioning system 512 and positioning system 514.

FIG. 6 illustrates a flowchart 600, according to one embodiment, for determining and using a transform between, for example, different positioning systems used by two devices, such as FIG. 4 devices 402, 404. For this embodiment, we may assume FIG. 5 as a context, where we will measure the physical X and Y dimensions 508, 510 of a display 502, and determine a transform between a positioning system 512 of a first device 402 (using internal logical X and Y units 504, 506) to the positioning system 514 used by a second device 404 operating a model based on real world dimensions, e.g., meters.

It will be appreciated that the illustrated operations are exemplary, and it should not be construed that exactly these operations must be performed, nor must they be performed in exactly this order. Unless indicated otherwise, the illustrated operations are presenting one embodiment of inventive concepts discussed herein and other operations and variations on operations may be performed to effect what is claimed. In the illustrated embodiment, one operation is to use a measuring tool, e.g., FIG. 5 measuring tool 516 to measure 602 a display, e.g., FIG. 5 display 502, to determine the display's physical X and Y dimensions 508, 510. It will be appreciated in some embodiments we may only measure one of the display dimensions, or we may only measure the diagonal dimension (not illustrated) of a display.

Once the display dimensions are known, a subsequent operation is to display 604 a reference object on the display. The reference object can be anything agreed upon to be used by both devices. For example, the reference object could be a blue square of a predetermined size, such as 5 units. It will be appreciated that for an environment, such as one including the first device 402 with the display 502, the first device 402 may be using a positioning system range, e.g., a coordinate range, different than the one used by the second device, such as second device 404, e.g., the augmented reality device, such as an iPad or phone or the like, that may be modeling the environment including the first device. Therefore, the reference object on the display 502 will have a size that is likely different than the apparent AR size of the square if represented by the second device 404 in its AR model for the environment. If we wanted to exchange rich content between the first and second devices 402, 404, such as to pull content from the display 502 and place it in the AR model of the second device 404, and have it appear as if the same content simply slid out of the screen into the AR model, the coordinate systems need to be synchronized so that one positioning system scales, after determining an appropriate transform, to be equivalent to the other devices' positioning system.

After displaying 604 the reference object, the second device may measure 606 the size of the reference object as it appears on the display. As noted above, the reference object need not be a square; rather, it can be anything so long as it is identifiable and measurable. In this example, we can assume the object is displayed at an agreed location, such as at the origin or its coordinate system. When the reference object is displayed 604 by the first device, the measurement 606 of the displayed object may be performed by the LiDAR or other tool available to the second device. For example, the displayed object may be measured to be 5 centimeters (cm) wide, and since the first device was asked to display a 5 unit square this means that the first device is displaying at 1 cm per unit. It will be appreciated units used by devices/software environments is arbitrary. In this embodiment, if the display was measured 602 as 20 cm wide, then we can determine 608 the display unit width used in the first device's model, which in this example is 20 units (i.e., 20 cm/1 cm). If we know how the second device is representing an environment, e.g., an iPad with a model where 1 unit is 1 meter (again, an arbitrary unit size example), we can now determine 610 the transform convert between the two positioning systems of the two devices.

It will be appreciated use of centimeters, meters or other size is an arbitrary decision in implementing hardware or software; any measurement system or systems may be used, since the transform to convert between measurement systems will accommodate whatever is used in a model. The operations of FIG. 6 may be done in advance of later interaction between the two devices, or the synchronization may be performed as part of an initial introduction of the two devices, such as in a museum, theater, or other environment where one may enter an area with the second device, and then seek to interact with a previously placed display. In some embodiments, a standardized display configuration is used in multiple environments, e.g., in multiple rooms/places/spaces/etc., so a transform need only be determined 610 once and then applied in multiple environments. For example, at an amusement park or museum, the same display configuration may be used throughout, and an AR device, such as the iPad Pro with LiDAR, may travel throughout the park or museum and interact with multiple displays without further need to determine a transform.

After the transform is known, the first device may then, for example, display content on its display, and the user of the second device may decide to interact with the display and, for example, indicate a selection 612 of an object displayed on the display. Since we know the transform between the two positioning systems, moving objects between the two devices, e.g., moving the selected object "out of" the display and "into" the AR model of the second device may be simply accomplished through a linear transform 614 from the display's positioning system to the second device's positioning system. The second device (the AR device) may move a model of a displayed object out of the display and into the AR model of the real world, as presented by the second device. In one embodiment, a "grab" operation may be performed on the selected 612 object, where the grab indicates the desire to move the object between the two devices, and the operation may be communicated between the devices using the DSL discussed above. Responsive to the indicated grab intent to move the object, each device performs an appropriate presentation as needed to coordinate presenting a desired visual effect corresponding to the grab operation. For example, for an object that is "grabbed" from the display, the two devices may coordinate so that the object appears to move into the plane of the display and exit the display while the second device (the AR device) updates its AR presentation to show the object coming into the AR model and "into" the real world.

It will be appreciated that the FIG. 4 backend infrastructure 406 discussed above may provide content to be displayed by the first device, data to be displayed by the second device in its AR model, and/or provide other information associated with AR, modeling and/or other operations performed by either the first or second device. In addition, or in lieu of the backend infrastructure, each device may have its own content that it may share between the devices. For example, an object on the first device display may be maintained by the first device, and when selected, data corresponding to the object may be provided to the second device to enable it to properly integrate the object into its AR model. It will be appreciated that integration of display data, including video, with AR models such as may be used by mobile devices may be incorporated into a video codec and/or an API to enable a broad range on data and capability sharing.

In one embodiment, multiple devices that seek to share content between their models (e.g., the model corresponding to the screen space, the model corresponding to the AR presentation, or other mapped environments) may agree on an anchor point that operates as a shared reference point in all of the models. The shared reference point, in combination with the determined transform(s) needed to switch between the various models, allows arbitrary content to be moved and/or shared between the models. It will be appreciated the AR model of the second device may be determined as discussed above with respect to FIGS. 1-3, and in one embodiment, the AR model may be extended to include the model (e.g., the screen space) determined by the first device having the display. That is, the second device may treat the screen space model as if it were generated by the first device and incorporate it.

It will be further appreciated that the screen space may be arbitrarily scaled. For example, in one embodiment, if the second device is modeling a room, and the first device's screen is on a wall in the room, one could scale the screen space to appear to cover the entire wall and in the AR model have the wall effectively disappear and be replaced by the screen space, so that the two devices may merge their models into one AR presentation by the second device. In one embodiment, selected ones of the first and second devices and backend infrastructure, see, e.g., FIG. 4 items 402-406, may employ an Artificial Intelligence (AI), such as machine learning and/or a neural network (such as provided by Apple's Bionic engine, available in recent iterations of iPhones and iPads), to facilitate seamless sharing of content and other data between the machines, and that the AIs may individually or cooperatively operate to assist with the embodiments disclosed herein.

FIG. 7 illustrates a flowchart 700, according to one embodiment, for determining and using a transform between different positioning systems. In this embodiment, a first device is instructed or requested 702, e.g., by way of the DSL discussed above, to output 704 a reference object. It will be appreciated the first device may already be presenting a reference object and this initial operation is unnecessary. As discussed above, the output may represent any tangible way of presenting information, such as by a display, projector, hologram, printing, digital ink, etc. It will be appreciated the capabilities or characteristics of the output may affect interaction between the first device and a second device, such as the iPad Pro discussed above, to interact with the first device.

For example, for a printed output (2D or 3D) an AR device such as the iPad may integrate the printed output into its AR model, but the output will likely have to remain physically present in the real world and either incorporated into the AR model, e.g., perhaps augmented/extended, or masked by the AR model, e.g., treated as a fixed point to be hidden with the AR presentation. Alternatively, if the output is a digital ink display, billboard, or other medium providing the semi-permanent digital ink, the AR device could as discussed above "grab" an object from the digital ink output and the digital ink display be instructed to refresh to remove that object for presentation by the AR device. As noted above the reference object may be an arbitrary object agreed upon in advance by the devices seeking to share data, and it will be appreciated that there may be multiple different objects that may be presented and recognized by other devices as being a reference object. For example, different shapes, colors, patterns, etc. may be applied to a reference object so long as the resulting reference object may be recognized as such. Characteristics of the reference object may be used as signals for how an AR device is expected to interact with the first device's output.

For a simple example, the object attributes may indicate whether the display of the first device is to be considered volatile/changeable, where the AR device may expect to be able to add to the first device's model and hence add to the output, or considered non-volatile, where the AR device may temporarily interact with the output but it will not record a change. In addition, the object attributes may signal a preference for how a transform between positioning systems is preferred to be performed. As illustrated, the AR device may evaluate 706 the output to identify any signals, context, or instructions that may be presented in the characteristics of the reference object. A transform, as discussed above with respect to FIG. 6 item 610, may be determined 708, e.g., by measuring the reference object in the context of the size of the output and comparing with the AR device's positioning system. In some embodiments the transform may be selected based at least in part on the evaluation 706. The AR device may also configure 710 itself according to the evaluation, such as to apply restrictions, permissions, or other parameters indicated from the evaluation 706 of reference object.

After the initial setup of the first device with an output to the AR device providing the AR presentation, e.g., the iPad Pro with LiDAR, a cell phone, or other AR capable device, the first device may output a scene. If the first device was the Apple TV noted above, outputting a scene may correspond to displaying the scene on a TV. The AR device may present 714 its AR model, e.g., it may model the environment in which the first device is disposed. In this example embodiment, assuming it is not contrary to any limitations indicated in the evaluation 706, the AR device may push 716 an object from the AR model into the scene provided by the first device. In the context of an Apple TV example, the Apple TV would receive and incorporate the pushed object into the scene it is displaying.

While various ones of the above embodiments. e.g., FIGS. 6-7, may discuss operations occurring at the direction of the second device with interaction with the first device, it will be appreciated operations may be controlled or otherwise performed at the direction of the first device, or the two devices may cooperate or arbitrate to determine a leading or controlling device. In one embodiment, the first device may instruct the second device to display the reference object so that one or both of the devices may determine a transformation between positioning systems. In another embodiment, the first device may display a reference object (as discussed above) and instruct the second device to measure the reference object and determine a transformation between positioning systems employed by the two devices. Having the first device control the interaction may be useful, for example, in a context where there may be many "first" devices to which a second device may communicate and the multiple other devices may direct which of them are to be interacting with the second device at a particular time. A museum or other interactive environment is one example where the second device may in fact be interacting with multiple other devices.

Figure 8:
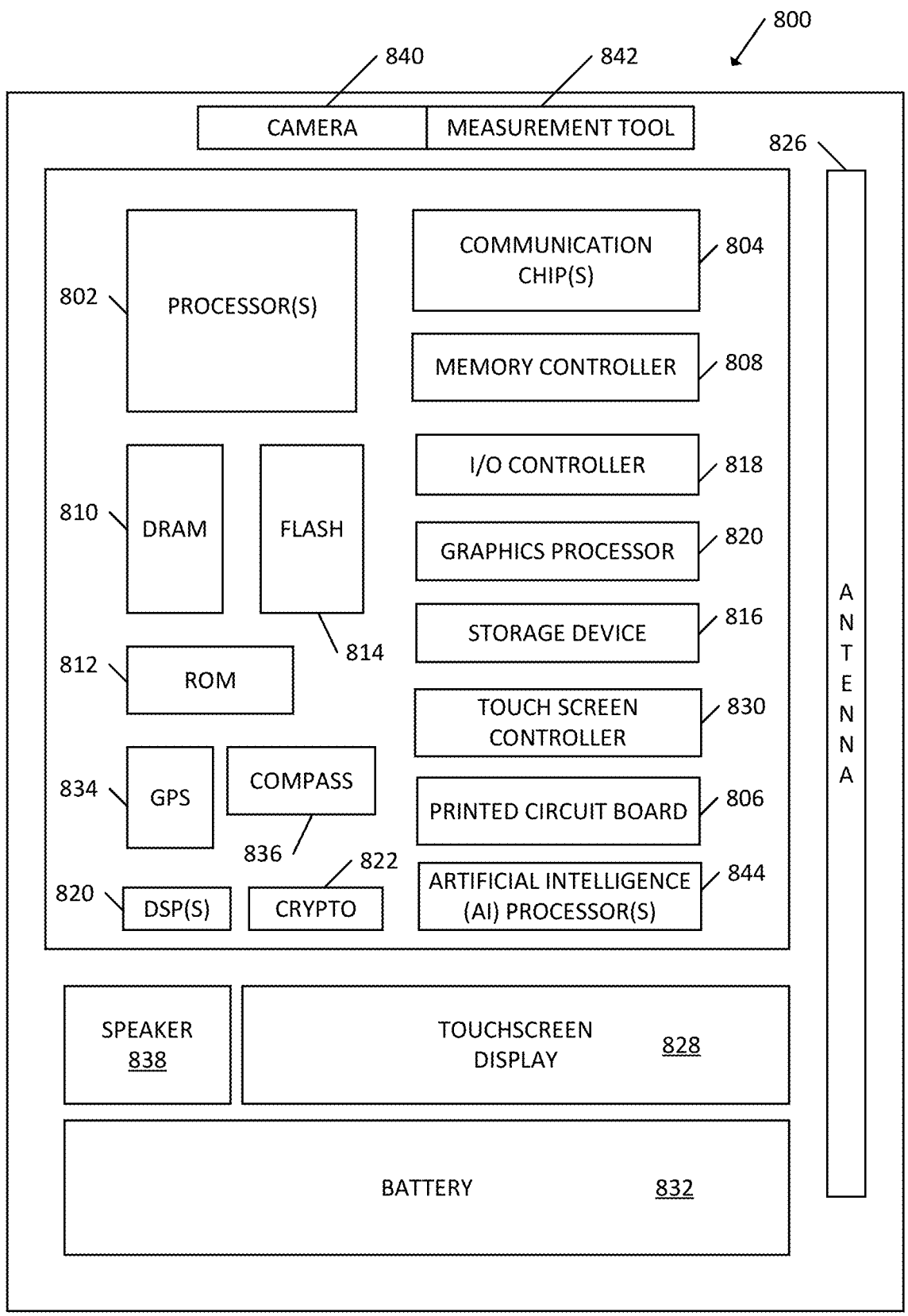
FIG. 8 illustrates an exemplary computer device in accordance with various embodiments that may embody some or all of the devices described herein.

FIG. 8 illustrates an exemplary computer device 800 in accordance with various embodiments that may embody some or all of the devices described herein, such as FIG. 1 item 102, FIG. 4 items 402, 404, etc. As shown, computer device 800 may include a number of components, such as one or more processor(s) 802 (one shown) and at least one communication chip(s) 804. In various embodiments, the one or more processor(s) 802 each may include one or more processor cores. In various embodiments, the at least one communication chip 804 may be physically and electrically coupled to the one or more processor(s) 802. In further implementations, the communication chip(s) 804 may be part of the one or more processor(s) 802. In various embodiments, computer device 800 may include printed circuit board (PCB) 806. For these embodiments, the one or more processor(s) 802 and communication chip(s) 804 may be disposed thereon. In alternate embodiments, the various components may be coupled without the employment of PCB 806.

Depending on its applications, computer device 800 may include other components that may or may not be physically and electrically coupled to the PCB 806. These other components include, but are not limited to, memory controller 808, volatile memory (e.g., dynamic random access memory (DRAM) 810), non-volatile memory such as read only memory (ROM) 812, flash memory 814, storage device 816 (e.g., a hard-disk drive (HDD)), an I/O controller 818, a digital signal processor 820, a crypto processor 822, a graphics processor 824 (e.g., a graphics processing unit (GPU) or other circuitry for performing graphics), one or more antenna 826, a display which may be or work in conjunction with a touch screen display 828, a touch screen controller 830, a battery 832, an audio codec (not shown), a video codec (not shown), a positioning system such as a global positioning system (GPS) device 834 (it will be appreciated other location technology may be used), a compass 836, an accelerometer (not shown), a gyroscope (not shown), a speaker 838, a camera 840, a measurement tool 842, e.g., LiDAR or other measurement tool, and other mass storage devices (such as hard disk drive, a solid state drive, compact disk (CD), digital versatile disk (DVD)) (not shown), and so forth.

As used herein, the term "circuitry" or "circuit" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, processor, microprocessor, programmable gate array (PGA), field programmable gate array (FPGA), digital signal processor (DSP) and/or other suitable components that provide the described functionality. Note while this disclosure may refer to a processor in the singular, this is for expository convenience only, and one skilled in the art will appreciate multiple processors, processors with multiple cores, virtual processors, etc., may be employed to perform the disclosed embodiments.

In some embodiments, the one or more processor(s) 802, flash memory 814, and/or storage device 816 may include associated firmware (not shown) storing programming instructions configured to enable computer device 800, in response to execution of the programming instructions by one or more processor(s) 802, to practice all or selected aspects of the methods described herein. In various embodiments, these aspects may additionally be or alternatively be implemented using hardware separate from the one or more processor(s) 802, flash memory 814, or storage device 816. In one embodiment, memory, such as flash memory 814 or other memory in the computer device, is or may include a memory device that is a block or byte addressable memory device, such as those based on NAND, NOR, or other technologies including future generation nonvolatile devices, or a combination of any of the above, or other memory. The memory device may refer to the die itself and/or to a packaged memory product.

In various embodiments, one or more components of the computer device 800 may implement an embodiment of the FIG. 1 item 102, or the FIG. 4 devices 403, 404, etc. Thus for example processor 802 could be in FIG. 4 item 402 communicating with memory 810 though memory controller 808. In some embodiments, I/O controller 818 may interface with one or more external devices to receive a data, such as FIG. 4 items 404, 406. Additionally, or alternatively, the external devices may be used to receive a data signal transmitted between components of the computer device 800.

The communication chip(s) 804 may enable wired and/or wireless communications for the transfer of data to and from the computer device 800. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip(s) may implement any of a number of wireless standards or protocols, including but not limited to protocols used by portable machines, computers, telephones and any other devices using various wireless technologies and protocols, including cellular standards, Bluetooth, derivatives thereof, as well as any other wireless. The computer device may include a plurality of communication chips 804. For instance, a first communication chip(s) may be dedicated to shorter range wireless communications such as Wi-Fi and Bluetooth, or other standard or proprietary shorter range communication technology, and a second communication chip 804 may be dedicated to longer range wireless communications. The communication chip(s) may implement any number of standards, protocols, or technologies datacenters typically use, such as networking technology providing high-speed low latency communication.

Computer device 800 may support any of the infrastructures, protocols and technology identified here, and since new technology is always being implemented, it will be appreciated the computer device is expected to support equivalents currently known or technology implemented in future. In various implementations, the computer device 800 may be a laptop, a netbook, a notebook, an ultrabook, a smartphone, a computer tablet, a personal digital assistant (PDA), an ultra-mobile PC, a mobile phone, a desktop computer, a server, a printer, a scanner, a monitor, a set-top box, an entertainment control unit (e.g., a gaming console, automotive entertainment unit, etc.), a digital camera, an appliance, a portable music player, or a digital video recorder, or a transportation device (e.g., any motorized or manual device such as a bicycle, motorcycle, automobile, taxi, train, plane, drone, rocket, etc.). It will be appreciated computer device 800 is intended to be any electronic device that processes data.

Figure 9:
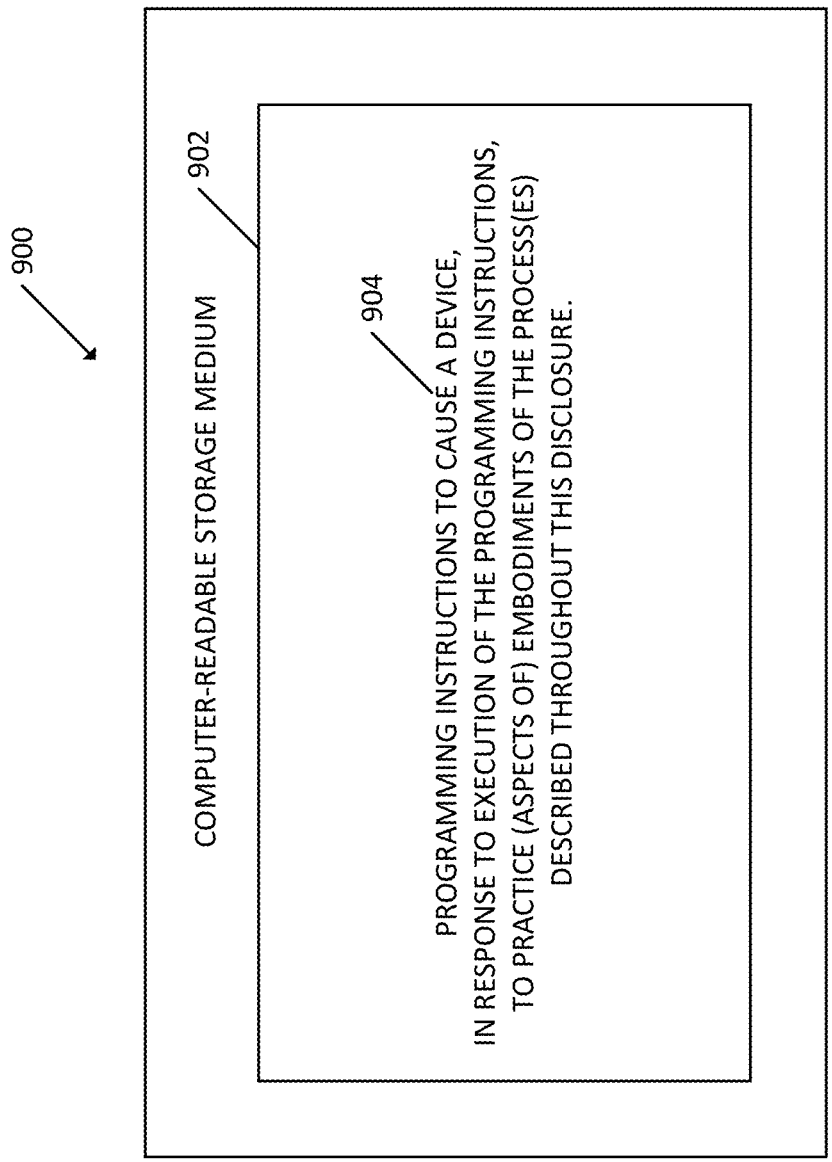
FIG. 9 illustrates an exemplary computer-readable storage medium.

FIG. 9 illustrates an exemplary computer-readable storage medium 900. The storage medium may be transitory, non-transitory or a combination of transitory and non-transitory media, and the medium may be suitable for use to store instructions that cause an apparatus, machine or other device, in response to execution of the instructions by the apparatus, to practice selected aspects of the present disclosure. As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium. As shown, non-transitory computer-readable storage medium 902 may include a number of programming instructions 904.

Programming instructions 904 may be configured to enable a device, e.g., computer device 800, in response to execution of the programming instructions, to implement (aspects of) the coordinate transformation disclosed herein, such as discussed above with respect to FIGS. 6 and 7. Programming instructions may result in one or more machines performing any of the operations discussed above and/or illustrated in the figures. For example, the instructions may result in one or more machine to display or measure a reference object (e.g., items 604, 606), determine a transform (e.g., item 610), evaluate a reference object (item 706), determine a transform (item 708), manipulate and/or transfer model objects (items 616, 716), etc. In alternate embodiments, programming instructions 904 may be disposed on multiple computer-readable non-transitory storage media 902 instead. In still other embodiments, programming instructions 904 may be disposed on computer-readable transitory storage media 902, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). Cooperative program execution may be for a fee based on a commercial transaction, such as a negotiated rate (offer/accept) arrangement, established and/or customary rates, and may include micropayments between device(s) cooperatively executing the program or storing and/or managing associated data.

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

What is claimed is:

1. A method for sharing Augmented Reality information between at least a first device having an output associated with a first positioning system and a first display, and a second device associated with a second positioning system, in which a desired content is to be exchanged between a source with a source coordinate system, and a destination with a destination coordinate system, the method comprising:
    detecting a reference object displayed on the first display from the output of the first device defined with respect to the first positioning system;
    measuring a size of the output and the first reference object displayed on the output to determine a first sync metric;
    comparing the first sync metric to at least a second sync metric for the reference object defined with respect to the second positioning system;
    determining a transformation between the first positioning system and the second positioning system based at least in part on the comparing the first and the second sync metrics;
    grabbing the desired content displaying on the first display for exchange with the second device; and
    translating the desired content from the first positioning system to the second positioning system.

2. The method of claim 1, further comprising:
    selecting an object instantiated within the first device according to the first positioning system;
    applying the transformation to the object to determine a transformed object defined with respect to the second positioning system; and
    presenting the transformed object within the second device.

3. The method of claim 2, wherein a control channel exchanges context data between the first and second devices to at least facilitate the determining the transformation.

4. The method of claim 3, further comprising translating a first scene of the first device to a second scene of the second device.

5. The method of claim 1, further comprising:
    automatically facilitating removing the desired content from the first display.

6. The method of claim 5, in which the source is the first device, and the destination is the second device, the method further comprising:
    automatically removing the desired content from the first display; and
    automatically displaying the desired content on a second display associated with the second device.

7. The method of claim 1, in which the second device includes a measurement tool, and wherein the measuring is performed at least with the measurement tool.

8. The method of claim 1, wherein the first and second devices are communicatively coupled by a selected one or more of a public network, a private network, or a peer-to-peer network.

9. A non-transitory computer readable medium (CRM) comprising instructions system for sharing Augmented Reality information between at least a first device having an output associated with a first positioning system and a first display, and a second device associated with a second positioning system, in which a desired content is to be exchanged between a source with a source coordinate system, and a destination with a destination coordinate system, the instructions, when executed by an apparatus, cause the second device to:
    detect a reference object to be displayed on the first display from the output of the first device defined with respect to the first positioning system;
    measure a size of the output and the first reference object to be displayed on the output to determine a first sync metric;
    compare the first sync metric to at least a second sync metric for the reference object defined with respect to the second positioning system; and
    determine a transformation between the first positioning system and the second positioning system based at least in part on the compare the first and the second sync metrics;
    grab the desired content from the source; and
    translate the desired content from the first positioning system to the second positioning system.

10. The CRM of claim 9, wherein the instructions are to further cause the second device to:
    select an object instantiated within the first device according to the first positioning system;
    apply the transformation to the object to determine a transformed object defined with respect to the second positioning system; and
    present the transformed object within the second device.

11. The CRM of claim 10, wherein the instructions are to further cause the second device to exchange context data with the first device.

12. The CRM of claim 11, wherein the instructions are to further cause the second device to translate a first scene of the first device to a second scene of the second device.

13. The CRM of claim 9, wherein the instructions are to further cause the second device to:
    automatically facilitate remove the desired content from the first display.

14. The CRM of claim 13, in which the second device is associated with a second display, and wherein the instructions are to further cause the second device to:
    automatically remove the desired content from the first display; and
    automatically display the desired content on the second display.

15. The CRM of claim 9, in which the second device to include a measurement tool, and wherein the instructions to measure include instructions to further cause the second device to utilize the measurement tool.

16. The CRM of claim 9, wherein the instructions are to further cause the second device to communicate with the first device using a selected one or more of a public network, a private network, or a peer-to-peer network.

17. A system for sharing Augmented Reality information between at least a first device having a first display and associated with a first coordinate system, and a second device having a second display, a measurement tool, and associated with a second coordinate system, comprising:
    detect a reference object defined with respect to the first coordinate system;
    measure, with the measurement tool, a size of the first display and the first reference object of the first display to determine a first sync metric;
    compare the first sync metric to at least a second sync metric for the reference object defined with respect to the second coordinate system;

determine a transformation between the first coordinate system and the second coordinate system based at least in part on the compare the first and the second sync metrics;
select an object displayed on the first display according to the first coordinate system;
apply the transformation to the object to determine a transformed object defined with respect to the second coordinate system;
automatically remove the desired content from the first display; and
display the transformed object on the second display.

18. The system of claim 17, further comprising:
exchange context data between the second device and the first device.

19. The system of claim 17, further comprising:
automatically display the desired content on the second display.

20. The system of claim 17, further comprising:
communicate with selected ones of the first device and the second device using a selected one or more of a public network, a private network, or a peer-to-peer network.

* * * * *